Jan. 13, 1959  C. H. HELBING ET AL  2,868,396
LEVEL CONTROL
Filed Sept. 12, 1956
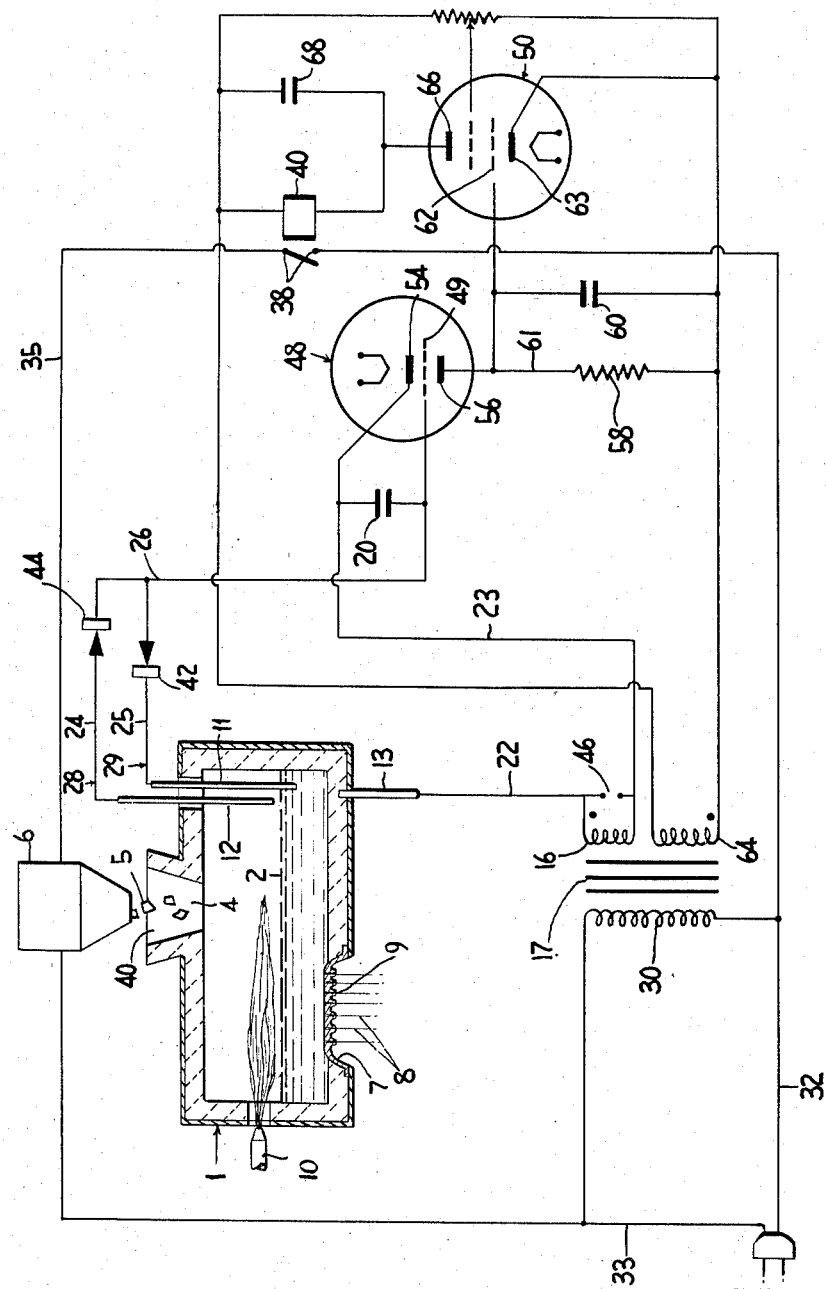
INVENTORS
CLARENCE H. HELBING and
BY MURRAY BARLOWE
Oscar L. Spencer
ATTORNEY

United States Patent Office 2,868,396
Patented Jan. 13, 1959

2,868,396

LEVEL CONTROL

Clarence Henry Helbing, Bay Shore, and Murray Barlowe, Bethpage, N. Y., assignors to Pittsburgh Plate Glass Company, Allegheny County, Pa., a corporation of Pennsylvania Application September 12, 1956, Serial No. 609,429

5 Claims. (Cl. 214—18.2)

The present invention relates to an apparatus for controlling the level of glass in a furnace and it has particular relation to an electronic circuit which is responsive to the level of glass in a furnace and which controls a charging mechanism for supplying raw materials to the furnace.

One method of forming glass fibers involves withdrawing a plurality of glass fibers from a melting furnace and winding the fibers on a rapidly rotating drum. The furnace and drum are reciprocated relative to each other so that the fibers are formed in a layers on the drum with the fibers in each layer being parallel to each other and at a slight angle to the fibers in each adjacent layer. The mat of fibers built up on the drum is removed from the drum and may be expanded to form a variety of glass fiber products.

One of the virtues of such a process of forming glass fibers is that small, inexpensive melting furnaces can be employed. Another advantage to the use of this process is that glass cullet can be employed, thereby rendering the cost of raw materials quite low.

The melting furnace employed in the process is composed of a substantially cylindrical, refractory tube with the axis of the tube being horizontal. The ends of the tube are enclosed and there is an opening in one end wall of the tube which permits entry of a gaseous flame to heat and melt the glass in the furnace. Glass cullet is supplied to the furnace through an opening in the upper portion of the furnace and glass fibers are drawn through orifices in a bushing provided in the bottom of the furnace.

The level of molten glass above the bushing in the furnace may be 1 to 4 inches or more depending upon the design of the furnace. Generally, 1 to 3 inches have been found to be a satisfactory depth of glass above the bushing in order to provide a sufficient supply of refined glass for continuous drawing under uniform conditions. It is highly desirable that the level of the glass in the furnace be maintained constant in order to produce fibers of constant diameter and insure continuous production of fibers. The temperature of the glass at the bushing orifices is critical in order to achieve these production conditions. A very small range of temperatures and glass viscosities is permitted and any extreme variation in temperature or viscosity causes discontinuance of the fiber forming process for one reason or another. If the level of the glass fluctuates greatly during the drawing operation, it is exceedingly difficult to maintain constant temperature conditions in the glass and erratic performance of the fiber forming process occurs.

The level of the glass in the furnace is maintained constant by adding glass cullet or glass forming material to the furnace as the fibers are withdrawn. Due to the small size of the glass furnace, small changes in the amount of glass contained therein, readily change the level of the glass. Thus, a very close control of the charging operation must be maintained.

It is a desideratum of the art to provide a means responsive to the level of the glass for controlling the charging of cullet or glass forming material to the furnace so as to maintain the glass level constant. Various types of probes connected to electrical relay systems have been tried. For example, an electrical system wherein an electrode is employed above the glass and an electrode is submerged in the glass or connected to the furnace beneath the glass has been tried and been unsuccessful.

The electrical resistance of the molten glass and the gaseous atmosphere just above the glass determines whether the circuit is operative to actuate a relay which in turn operates a glass cullet charging mechanism. The resistance between the electrodes is, of course, very much greater when the probe is not in contact with the glass than when it is in contact with the glass. In this system, the relay was set to be actuated at a resistance somewhere between the resistance of the glass and the combined resistance of the glass and gas. This system was not effective because the resistances of the gas and the glass varied so much that a resistance setting which would always be between the two resistance conditions wherein the electrode was either in the glass or above the glass could not be found.

For instance, in a given situation, the resistance of the glass was measured and found to be 175,000 ohms and the gas resistance was found to be 1,000,000 ohms. A simple one tube circuit was designed to trip a relay at a resistance of 175,000 ohms up to 1,000,000 ohms. In operation, this circuit was found to be tripped while the probe was still in the glass. Upon testing, it was found that the resistance of the gas and the glass had changed considerably and therefore the original conditions were no longer applicable. The resistances of the glass and the gas were studied and were found to change to a considerable extent and such changes could not be predicted. Thus, it was impossible to find a single setting which would operate as desired for all known conditions of glass and gas resistances.

In accordance with the present invention, it has been found that even though the resistance of the glass and gas may vary considerably during operation, the ratio of the resistance of the glass to the resistance of the glass plus the gas remains fairly constant. A special circuit has been devised to make use of this property of the glass and the gases in the furnace immediately above the glass so as to control the level of the glass by controlling a charging mechanism for supplying feed material to the furnace.

The novel glass level apparatus employs three electrodes. At least two of these electrodes are positioned in the furnace. The tip of one of the electrodes is submerged in the glass at all times. This electrode is wired in series with a second electrode which acts as a ground and is positioned beneath the surface of the glass, being either submerged in the glass or attached to the refractory or metal support of the furnace below the glass, a third electrode is positioned so that its lowermost tip is out of the glass when the glass level is too low and is submerged in the glass when the glass level is too high.

Two circuits having the second electrode in common are used. One circuit contains the first and second electrodes and the other circuit contains the second and third electrodes. A suitable means, such as a condenser, detects the difference in resistances between the two circuits and in turn actuates a means for energizing the charging mechanism.

The invention may be further described in conjunction with the drawing in which:

The single figure illustrate diagrammatically the circuits in combination with the furnace and means for charging the furnace with feed material.

A furnace 1 containing molten glass 2 is shown in the drawing. The furnace is provided with opening 4 in its upper portion through which cullet 5 from a charging mechanism 6 may be supplied to the interior of the furnace. A bushing 7 is provided in the bottom of the furnace and glass fibers 8 are drawn through orifices 9 in the bushing. The glass is heated by gaseous flames from a burner 10.

Three electrodes are provided to control the level of the glass in the furnace. These electrodes are part of interconnecting circuits which actuate a relay, which in turn permits the charging mechanism 6 to operate and supply glass cullet to the furnace and maintain the glass at the desired level. The electrodes and their function in the circuits is now described in conjunction with the wiring diagram in the drawing.

Electrodes 11 and 12 are positioned in the interior of the furnace. The lower tip of electrode 11 extends beneath the level of the glass at all times. The electrode 11 may be mounted in the furnace in other ways. For example, the electrode may extend into the glass through the side or bottom of the furnace with the tip of the electrode being in the molten glass. The lower tip of the electrode 12 extends into the glass when the level of the glass is too high, but does not extend into the glass when the level of the glass is too low.

Electrode 13 is fastened to the furnace structure directly below the electrodes 11 and 12 with the glass 2 and refractory structure of the furnace acting as a resistance to the flow of current between the electrodes 11 and 12 and the electrode 13. The electrodes 11, 12 and 13 are connected to the secondary winding 16 of a transformer 17 through condenser 20 by means of lines 22, 23, 24, 25 and 26. These lines constitute two electrode circuits 28 and 29 having lines 22, 23 and 26, electrode 13, secondary winding 16 and condenser 20 in common. Electrodes 11 and 12 are wired in parallel by lines 24 and 25 and electrode 13 is wired in series with electrodes 11 and 12 by the lines 22, 23 and 26.

The primary winding 30 of the transformer 17 is energized from 110 volt alternating current supply lines 32 and 33. The charging means 6 is connected in parallel with the primary winding 30 through lines 32, 33 and 35. There is an opening between lines 33 and 35 in series with the charging means 6. This opening is closed to complete the lines 33 and 35 and circuit in which the charging means is located by closing the space between contacts 38 with relay 40. The relay 40 is actuated by a circuit connected with the electrode circuits 28 and 29 in a manner which is described below.

Two rectifiers 42 and 44 are positioned in the electrode circuits 29 and 28. The rectifiers are wired in parallel to each other and in series with the electrodes 11 and 12 respectively. Rectifier 42 is wired in series with probes 11 and 13 and permits current to flow only in one direction between these electrodes, i. e., from electrode 11 to electrode 13. Rectifier 44 permits current to flow only in one direction between electrodes 12 and 13, i. e., from electrode 13 to electrode 12. The power for the electrode circuits 28 and 29 is supplied through connections 46 from a suitable power source. The electrode circuits are connected to a high vacuum triode 48 and they control the action of the tube. A grid 49 is a part of the electrode circuits 28 and 29 and acts as a control in the triode 48. The triode in turn controls the action of the relay 40 through amplifier 50.

In the operation of the furnace 1, the level of the glass 2 rises and falls, thereby contacting and breaking contact with the electrode 12. The positioning of electrode 12 is such that it is in the glass when the level is too high and is out of the glass when the glass level is too low.

When the electrode 12 is not submerged in the glass, the resistance of the gas reduces the current flow between electrodes 12 and 13 and substantially all of the current flow in the electrode circuit is between electrodes 11 and 13. During the negative half cycle, current from secondary winding 16 of transformer 17 passes through the glass, electrodes 11 and 13 and rectifier 42 and gradually and continually charges condenser 20 so that the grid 49 of tube 48 is negative to its cathode 54. During the positive half cycle, rectifier 42 prevents current flow through electrodes 11 and 13 and the negative charge built up on the condenser 20 on the previous half cycle remains and retains the grid 49 negative.

Due to the negative charge on the grid 49 of the tube 48, the flow of current through the cathode 54 and plate 56 of the tube 48 is prevented or reduced. When this current flow is prevented, the voltage drop across resistor 58 is low or nil and the charge on condenser 60 is low or nil. The resistor 58 and condenser 60 are wired in parallel to each other and connected in series with plate 56 by means of line 61.

In this case, the grid 62 is at substantially the same potential as its cathode 63. This permits the current from secondary winding 64 during one half cycle to flow from the cathode 63 to the plate 66 in the plate circuit of tube 50 and through relay 40. The condenser 68 builds up the charge and holds the relay 40 energized during the alternate half cycle during which tube 50 does not conduct. The actuation of the relay 40 closes contacts 38 and energizes the charging means 6 to cause it to feed glass cullet to the furnace.

When the electrode 12 is submerged in the glass, the resistance between the electrodes 12 and 13 is substantially the same as the resistance between the electrodes 11 and 13. During the negative half cycle, current from the secondary winding 16 of transformer 17 passes through the glass, electrodes 12 and 13 and rectifier 42 and tends to build up a charge on the condenser 20, however, during the positive half cycle, the current from the secondary winding 16 of transformer 17 passes through the glass, electrodes 11 and 12 and rectifier 44 and tends to build up an opposite and neutralizing charge on the condenser 20, so that the condenser is effectively not charged and grid 49 is effectively neutral. This permits current from the secondary winding 16 of transformer 17 to flow through the cathode 54 and plate 56 of the tube (during the alternate half cycle referred to above during which tube 50 does not conduct), thereby charging condenser 60 and maintaining grid 62 negative relative to cathode 63. This prevents current flow from the cathode 63 to plate 66 in tube 50. During the next half cycle, the tube 50 is prevented from conducting by the negative charge built up on condenser 60 and on grid 62. Since no current is flowing in the tube 50, the relay 40 is not energized, contacts 38 are not closed and charging means 6 is not activated.

From the above description of the circuits, it can be seen that a control has been provided which operates according to the ratio of the resistance of the glass to the resistance of the gas plus that of the glass. This is enabled by the directional and alternate current flow between the two electrodes 11 and 12 positioned in the furnace and the common electrode 13 as controlled by the two rectifiers 42 and 44 connected respectively in series with the two electrodes 11 and 12. This directional and alternate current flow charges or does not charge a condenser and control grid of a tube to control a relay which in turn actuates the charging mechanism.

The charge on the condenser is developed by the current permitted to flow by the resistance between each electrode and the common electrode and the direction of the current flow is established by the rectifiers. The rectifiers establish the current so that the charges tend to cancel each other and the resultant charge is a function of the ratio of the resistances. Other means for detecting the ratio of the resistances in circuits 28 and 29 may be employed.

The circuits described above may be altered and similar results obtained. For example, rectifier 42 may be switched in the opposite direction and rectifier 44 eliminated. The difference in resistance between the gas and the glass is measured in these modified circuits in the same manner as described above with respect to the illustrated circuits of the drawing.

The particular method of amplifying or transferring the signal from tube 48 to the relay 40 is shown merely by way of illustration and not limitation. Other conventional methods of transferring or amplifying this signal may be employed. Also, the particular method of relaying the signal to the charging means and method of actuating the charging means may be accomplished in any well known manner. The charging means 6 may be a Syntron Vibrator or other commercially available batch or cullet feeding mechanism.

Although the present invention has been described with respect to specific details of certain embodiments thereof, it is not intended that such details be limitations upon the scope of the invention except insofar as set forth in the accompanying claims.

We claim:

1. An apparatus for controlling the operation of a charging means so as to control the level of glass in a furnace which comprises a first circuit including a source of current, a first electrode positioned in the furnace so that the tip of the electrode is always submerged in the glass and a second electrode positioned in series with the glass and the first electrode, a second circuit including a source of current, the second electrode and a third electrode positioned in the furnace so that the tip of the electrode extends into the glass when the level of the glass is proper or too high and does not extend into the glass when the level of the glass is too low, said third electrode being in series with the glass and the second electrode, means in the first and second circuits for detecting the difference in resistance in the circuits and means responsive to the detecting means to energize and deenergize the charging means.

2. An apparatus for controlling the operation of a charging means so as to control the level of glass in a furnace which comprises a first circuit including a source of current, a first electrode positioned in the furnace so that the tip of the electrode is always submerged in the glass and a second electrode positioned in series with the glass and the first electrode, a second circuit including a source of current, the second electrode and a third electrode positioned in the furnace so that the tip of the electrode extends into the glass when the level of the glass is proper or too high and does not extend into the glass when the level of the glass is too low, said third electrode being in series with the glass and the second electrode, a rectifier in one of the circuits permitting current to flow through the glass and electrodes in that circuit in one direction only, means in the first and second circuits for detecting the difference in resistance in the circuits and means responsive to the detecting means to energize and deenergize the charging means.

3. An apparatus for controlling the operation of a charging means so as to control the level of glass in a furnace which comprises a first circuit including a source of current, a first electrode positioned in a furnace so that the tip of the electrode is always submerged in the glass, a second electrode positioned in series with the glass and the first electrode and a first rectifier wired in series with the glass and first and second electrodes permitting current to flow in one direction only through the glass and the first and second electrodes, a second circuit including a source of current, the second electrode, a third electrode positionable in the furnace so that the tip of the electrode extends into the glass when the level of the glass is proper or too high and does not extend into the glass when the level of the glass is too low, said third electrode being in series with the glass and the second electrode and a second rectifier wired in series with the glass and the second and third electrodes so as to permit current to flow through the glass and the second and third electrodes in one direction only, which direction is opposite to that direction which current is permitted to flow through the second electrode by the first rectifier, means in the first and second circuits for detecting the difference in resistance of the circuits and means responsive to the detecting means to energize and deenergize the charging means.

4. An apparatus for controlling the operation of a charging means so as to control the level of glass in a furnace which comprises a first circuit including a source of current, a first electrode positioned in a furnace so that the lowermost tip of the electrode is always submerged in the glass, a second electrode positioned below the first electrode in series with the glass and the first electrode and a first rectifier wired in series with the glass and the first and second electrodes permitting current to flow in one direction only through the glass and the first and second electrodes, a second circuit including a source of current, the second electrode, a third electrode positioned in the furnace so that the lowermost tip of the electrode extends into the glass when the level of the glass is proper or too high and does not extend into the glass when the level of the glass is too low, said third electrode being in series with the glass and the second electrode and a second rectifier wired in series with the glass and the second and third electrodes so as to permit current to flow through the glass and the second and third electrodes in one direction only, which direction is opposite to that direction which current is permitted to flow through the second electrode by the first rectifier, means in the first and second circuits for detecting the difference in resistance of the circuits, and means responsive to the detecting means to energize and deenergize the charging means.

5. An apparatus for controlling the operation of a charging means so as to control the level of glass in a furnace which comprises a first circuit including a source of current, a first electrode positionable in a furnace so that the lowermost tip of the electrode is always submerged in the glass, a second electrode positionable below the first electrode in series with the glass and the first electrode and a first rectifier wired in series with the first and second electrodes permitting current to flow in one direction only through the glass and the first and second electrodes, a second circuit including a source of current, the second electrode, a third electrode positionable in the furnace so that the lowermost tip of the electrode extends into the glass when the level of the glass is proper or too high and does not extend into the glass when the level of the glass is too low, said third electrode being in series with the glass and the second electrode and a second rectifier wired in series with the glass and the second and third electrodes so as to permit current to flow through the glass and the second and third electrodes in one direction only, which direction is opposite to that direction which current is permitted to flow through the second electrode by the first rectifier, a condenser in the first and second circuits for detecting the difference in potential charge in the circuits, a tube containing a grid and a plate circuit, the grid being attached to and charged by the condenser and means responsive to the plate circuit to energize and deenergize the charging means.

References Cited in the file of this patent

UNITED STATES PATENTS

| | | |
|---|---|---|
| 1,961,893 | Wadman et al. | June 5, 1934 |
| 2,565,136 | Kretzmer | Aug. 21, 1951 |